(12) United States Patent
Christensen et al.

(10) Patent No.: US 10,731,683 B2
(45) Date of Patent: Aug. 4, 2020

(54) FASTENING DEVICE

(71) Applicant: AIRBUS OPERATIONS LIMITED, Bristol (GB)

(72) Inventors: Richard Christensen, Bristol (GB); Harish Agadi, Bristol (GB); Lee Randle, Bristol (GB)

(73) Assignee: Airbus Operations Limited, Bristol (GB)

(*) Notice: Subject to any disclaimer, the term of this patent is extended or adjusted under 35 U.S.C. 154(b) by 686 days.

(21) Appl. No.: 15/166,464

(22) Filed: May 27, 2016

(65) Prior Publication Data

US 2016/0347439 A1    Dec. 1, 2016

(30) Foreign Application Priority Data

May 29, 2015  (GB) .................... 1509305.7

(51) Int. Cl.
| | |
|---|---|
| *F16B 5/02* | (2006.01) |
| *B64C 7/00* | (2006.01) |
| *F16B 37/04* | (2006.01) |

(52) U.S. Cl.
CPC .................. *F16B 5/02* (2013.01); *B64C 7/00* (2013.01); *F16B 5/025* (2013.01); *F16B 5/0233* (2013.01); *F16B 37/04* (2013.01)

(58) Field of Classification Search
CPC .......... F16B 5/02; F16B 5/0208; F16B 5/025; F16B 5/04; F16B 5/06; F16B 5/0607;

(Continued)

(56) References Cited

U.S. PATENT DOCUMENTS

| | | | |
|---|---|---|---|
| 1,690,078 A | 10/1928 | Pierce | |
| 2,401,824 A | 6/1946 | Gladden et al. | |

(Continued)

FOREIGN PATENT DOCUMENTS

| | | |
|---|---|---|
| DE | 100 53 599 A1 | 5/2002 |
| EP | 0 791 759 A1 | 8/1997 |

(Continued)

OTHER PUBLICATIONS

European Seach Report for European Application No. 16169557.2 dated Oct. 21, 2016.

*Primary Examiner* — Michael P Ferguson
(74) *Attorney, Agent, or Firm* — Jenkins, Wilson, Taylor & Hunt, P.A.

(57) ABSTRACT

The invention relates to an aircraft structure, the aircraft structure comprising a first component and a second component. A fastening device fastens the first component to the second component, wherein the fastening device comprises a clamping member, and a fastening member. The fastening member has a longitudinal axis, and the clamping member is associated with the first component such that the clamping member is movable in a first direction and is fixed in position in a second direction, the first direction being parallel to the longitudinal axis of the fastener, wherein the fastener extends through the second component into engagement with the clamping member and holds the clamping member against the second component. The fastening device may hold the first component and second component in a fixed position relative to one another, in at least one direction, without applying a clamping force between the first component and second component.

12 Claims, 5 Drawing Sheets

(58) Field of Classification Search
CPC ...... F16B 5/0621; F16B 5/0642; F16B 5/065;
F16B 37/044; F16B 5/0216; F16B
5/0233; F16B 5/0241; F16B 5/01; Y10T
403/33; Y10T 403/335; Y10T 403/75
See application file for complete search history.

(56) References Cited

U.S. PATENT DOCUMENTS

| | | | | |
|---|---|---|---|---|
| 2,522,329 | A | * | 9/1950 | Wolff, Jr. .................. F16B 5/04 228/135 |
| 2,815,789 | A | * | 12/1957 | Hutson ................. F16B 37/044 411/111 |
| 3,093,222 | A | * | 6/1963 | Christoffersen ...... F16B 5/0208 403/408.1 |
| 3,157,215 | A | * | 11/1964 | Zahodiakin ......... F16B 37/0857 411/267 |
| 3,189,076 | A | * | 6/1965 | Adams ................. F16B 37/043 411/113 |
| 3,449,004 | A | * | 6/1969 | Anderson ............. F16B 5/0208 403/408.1 |
| 3,777,358 | A | * | 12/1973 | Matievich ............. F16B 5/0208 29/235 |
| 4,193,435 | A | | 3/1980 | Charles et al. |
| 4,553,890 | A | * | 11/1985 | Gulistan ............... F16B 41/002 411/318 |
| 4,557,650 | A | * | 12/1985 | Molina ................. F16B 37/068 411/108 |
| 4,865,500 | A | * | 9/1989 | Duran ................... F16B 5/0208 411/103 |
| 5,779,409 | A | * | 7/1998 | Manzolli ................. F16B 31/02 411/105 |
| 2005/0134069 | A1 | | 6/2005 | Odulio et al. |
| 2012/0174765 | A1 | | 7/2012 | Kunda |
| 2012/0222199 | A1 | * | 9/2012 | Tatomir ................... A42B 3/20 2/422 |
| 2014/0283363 | A1 | | 9/2014 | Wilkerson et al. |

FOREIGN PATENT DOCUMENTS

| | | |
|---|---|---|
| EP | 1 598 562 A1 | 11/2005 |
| EP | 3 098 459 B1 | 12/2019 |
| GB | 2 190 423 A | 11/1987 |
| GB | 2 206 939 * | 2/1991 .............. F16B 15/00 |
| GB | 2 516 692 A | 2/2015 |

\* cited by examiner

FASTENING DEVICE

RELATED APPLICATIONS

The present application claims priority from Great Britain Application Number 1509305.7, filed May 29, 2015, the disclosure of which is hereby incorporated by reference herein in its entirety.

BACKGROUND OF THE INVENTION

The present invention relates to a fastening device. More particularly, but not exclusively, this inventions concerns a fastening device for fastening a first part to a second part. The invention also concerns the fastening of a first part to a second part, where at least one of the first part and second part includes a manufacturing tolerance, and the fastening device at least partially adapts to this tolerance.

Many components in an aircraft are made out of composite materials, such as carbon fibre reinforced plastic, or glass fibre reinforced plastic. Aircraft also often comprise components made of metal. When joining a component made of a composite material to a component made of metal, it is desirable that any coupling between the two components is such that the coupling stress is reduced. This is particularly advantageous for composite components, which when loaded, or stressed, in certain directions may be vulnerable to damage or failure. Additionally, composite components are usually made with at least one datum face, with a closely controlled profile, and a non-datum face, where manufacturing tolerances may exist. When a composite component is joined to a metal component, the non-datum face is may be in contact with the metal component, meaning that there may be a gap between at least part of the contact surfaces between the composite component and metal component. Simply tightening a bolt through the composite component and metal component may act to close this gap, thereby potentially deforming the datum face of the composite component and also stressing the composite component. This may lead to damage or failure of the composite component, thereby requiring replacement or repair, and increasing aircraft maintenance time and cost.

The paragraph above describes joining a composite component to a metal component. However, the problems raised by manufacturing tolerances may be even more pronounced when joining together two composite components.

The present invention seeks to mitigate the above-mentioned problems. Alternatively or additionally, the present invention seeks to provide an improved fastening device.

SUMMARY OF THE INVENTION

The present invention provides, according to a first aspect, an aircraft structure, the aircraft structure comprising a first component and a second component, and a fastening device fastening the first component to the second component, wherein the fastening device comprises a clamping member, and a fastening member, the fastening member with a longitudinal axis, the clamping member associated with the first component such that the clamping member is movable in a first direction and is fixed in position in a second direction, the first direction being parallel to the longitudinal axis of the fastener, wherein the fastener extends through the second component into engagement with the clamping member and holds the clamping member against the second component.

The fastening device may act to securely hold the first component and second component in a fixed position relative to one another, in at least one direction, without applying a clamping force between the first component and second component.

The first component may comprise a clamping member receiving portion, the clamping member receiving portion configured to at least partially receive the clamping member. Such an arrangement may allow the first component and second component to be brought into close proximity to each other for being joined together, without the clamp obstructing the second component. The clamping member receiving portion may act to restrict the movement of the clamping member in directions other than the first direction.

The clamping member may be associated with an anchor nut. The clamping member may be associated with a first side of the first component and the anchor nut associated with a second, opposite, side of the first component. The clamping member may be riveted or bolted to the anchor nut, or any other suitable method of joining as would be understood by the skilled person. The clamping member and anchor nut may be slidable relative to the first component, such that the clamping member may be slid into a first position proximate to the first component, for example, fully received within the clamp receiving portion, and a second position, away from the first position, such that the clamping member at least partially extends from the clamp receiving portion.

The clamping member may be arranged such that the clamping member is movable only in one direction with respect to the first component, and movement in other directions, in particular in different planes, is restricted. The clamping member may be secured to the anchor nut by at least two connection points, such connection points spaced with respect to each other. The connection points may be associated with distinct apertures through the first component, the apertures located such that rotational movement, or movement of the clamp in the plane of the first component, is prevented.

The anchor nut may comprise a threaded aperture.

The fastener may be a threaded bolt. The fastener may be configured to extend through the first component, through the sliding clamp, and into engagement with the anchor nut. The second component may comprise a countersunk aperture for receiving a countersunk bolt end of the fastener. Therefore, the fastener may form a flush surface with the second component.

The fastener may pull the clamp into engagement with the second component such that the anchor nut does not contact, or exert any force on, the first component, in the direction in which the fastener extends. However, the fastening device may be configured such that it prevents movement of the first component and second component in a direction perpendicular to the direction in which the fastener extends. Such an arrangement may resist shear loads applied to the fastening device, keeping the first component and second component in a fixed position relative to each other.

The first component may be a metal component. Alternatively, the first component may be a composite component. The second component may be a composite component. The second component may be any component which includes a surface intended to be brought into contact with a first component, where that surface includes a manufacturing tolerance meaning that the surface may be prevented from sitting flush to the first component.

The aircraft structure may comprise a plurality of fastening devices, the fastening devices each comprising a fastening clamp movable in a different direction to the other fastening clamps and fixed in a different direction to the other fastening clamps. Such an arrangement may provide an aircraft structure that is securely fastened together, with the fastening devices preventing movement of the two components relative to each other in a number of different directions.

According to a second aspect of the invention there is also provided an aircraft, the aircraft comprising an aircraft structure as described in relation to the first aspect of the invention.

According to a third aspect of the invention, there is provided a fastening device, the fastening device comprising a clamping member, an anchor nut, and a fastener, wherein the clamping member is fixedly attached to the anchor nut, and the fastener is removably engaged with the clamping member.

According to a fourth aspect of the invention, there is provided a method of joining a first component and second component, the method comprising the steps of locating a clamping member between the first component and second component, attaching an anchor nut to the clamping member, such that the clamping member is movable relative to the first component in a first direction and fixed relative to the first component in a second, different direction, and engaging a fastener with the clamping member through the second component, such that the clamping member moves into contact with the second component.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
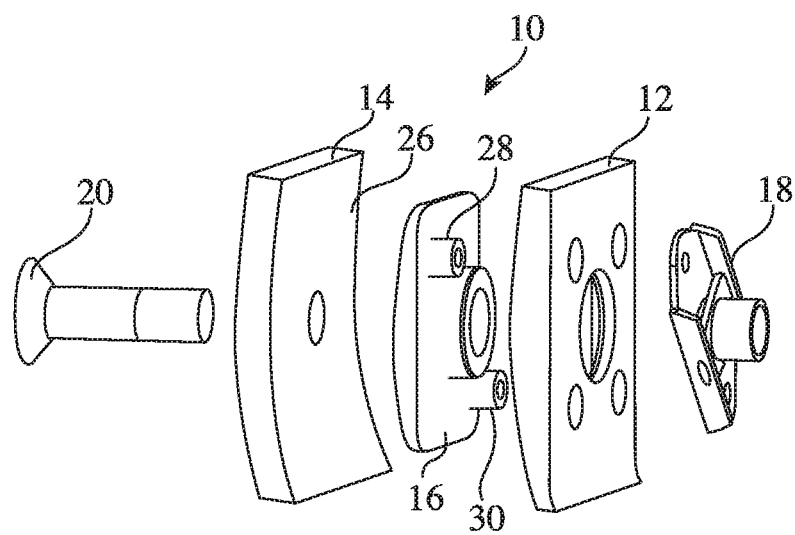
FIG. 1 shows an exploded view of a fastening device according to a first embodiment of the invention.

FIG. 1 shows a fastening device 10 for fastening together a first component 12 and a second component 14. The fastening device 10 comprises a clamping member 16, an anchor nut 18, and a fastener 20. The first component 12 is an approximately planar metal component, with a receiving section 22 arranged to at least partially receive the clamping member 16. The first component 12 includes an engagement surface 24 which is arranged to be brought into proximity and possibly partial contact with a corresponding engagement surface 26 on the second component 14. The second component 14 is an approximately planar composite component, and the engagement surface 26 is the non-datum surface of the component. Therefore, the engagement surface 26 of the second component 14 and the engagement surface 24 of the first component 12, whilst being in close proximity to each other, may not be in flush contact across all of the engagement surfaces 24, 26.

In order to secure the first component 12 to the second component 14 without squeezing the first component 12 and second component 14 together, and potentially damaging the first and/or second component 12, 14, a threaded portion of the fastener 20 extends through an aperture in the second component 14, a corresponding aperture in the clamping member 16, and into engagement with a correspondingly threaded portion of the anchor nut 18. The fastener 20 has a longitudinal axis, this being the direction in which the fastener extends through the second component 14, the clamping member 16 and the anchor nut 18. The anchor nut 18 is connected, via rivets, to two connecting portions 28 and 30 of the clamping member 16, through corresponding apertures in the first component. The connection between the anchor nut 18 and the clamping member 16 is such that limited movement between the clamping member 16 and the receiving portion 22 in the same direction as the longitudinal axis of the fastener 20 is allowed, but that rotational movement, or movement in the plane of the approximately planar first component 12 is prevented. Engaging the fastener 20 with the anchor nut 18 pulls the clamping member 16 into contact with the second component 14. Provided that the manufacturing tolerance in the two components is not too great, the clamping member 16 is brought into contact with the second component 14 without the anchor bolt pressing on the first component 12. Therefore, the second component 14 is secured against rotational movement relative to the first component, and in plane movement relative to the first component, without there being a clamping force between the first component 12 and second component 14.

Figure 2:
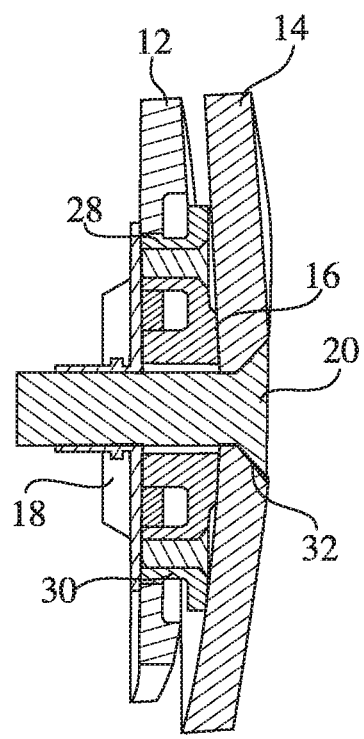
FIG. 2 shows a cross-sectional view of the fastener according to the first embodiment of the invention.

FIG. 2 shows a cross-sectional view of the fastening device 10 described with reference to FIG. 1. The clamping member 16 is located within the receiving section 22 of the first component 12. The anchor nut 18 is located to the other side of the first component 12, and is riveted to the clamping member 16 by the connecting portions 28 and 30. The second component 14 with the fastener 20 extending through a countersunk aperture 32, is brought into proximity to the second component 14. The first component 12 and second component 14 are then joined together, with the fastener 20 extending through the clamping member 16 and into engagement with the anchor nut 18. The clamping member 16 is then pulled against the second component 14 by the fastener 20, which is shown in FIG. 2.

Figure 3:
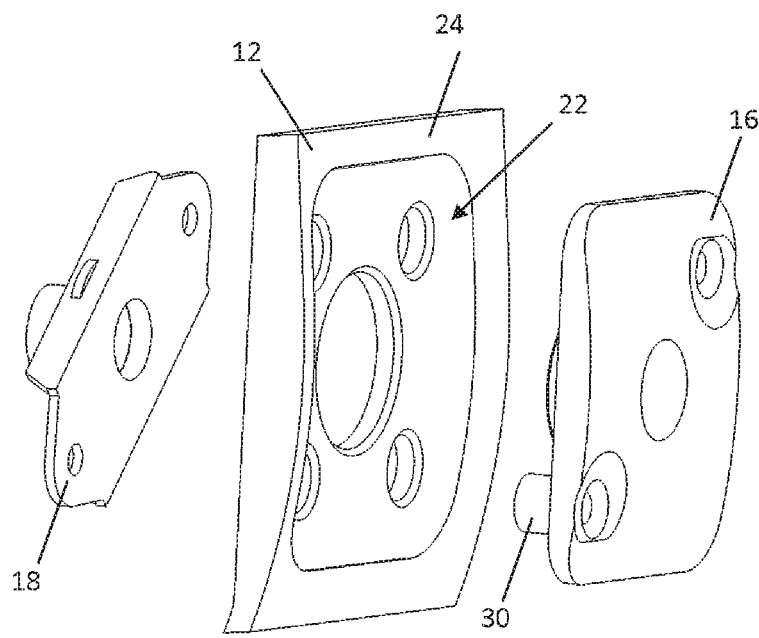
FIG. 3 shows an exploded view of various elements of the fastening device according to the first embodiment of the invention.

FIG. 3 shows an exploded view of the clamping member 16, the first component 12, with the receiving section 22, and the anchor nut 18.

Figure 4:
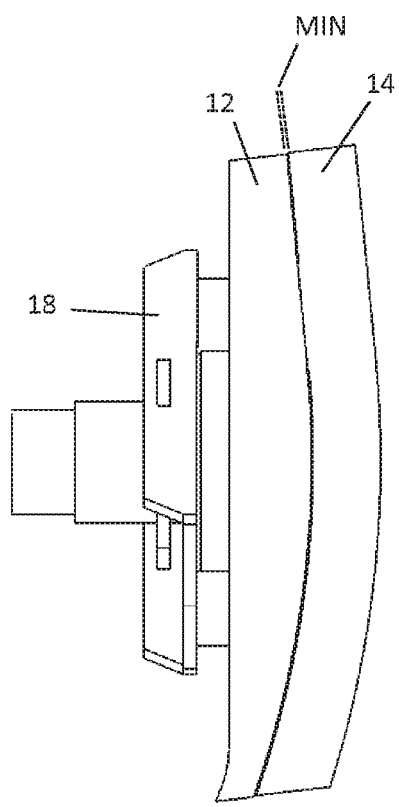
FIG. 4 shows a cross-sectional view of the fastener in one structural member.
Figure 5:
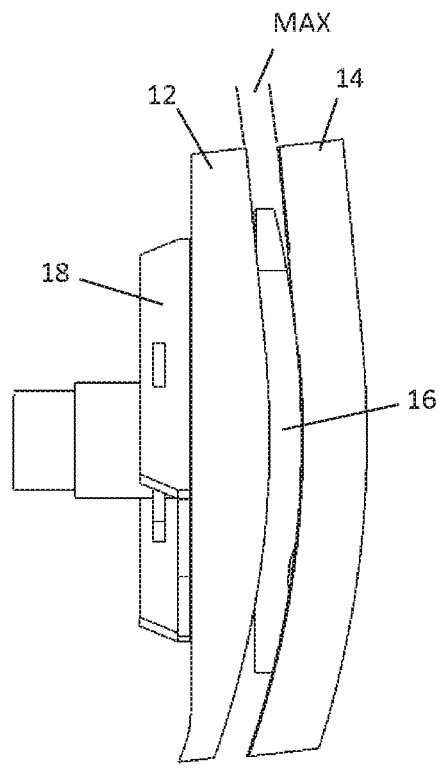
FIG. 5 shows a cross-sectional view of the fastener in a second structural member, the second structural member having larger manufacturing tolerances than the structural member shown in FIG. 4.

FIG. 4 shows a first component 12 and second component 14 with a small manufacturing tolerance (MIN) between the two components. FIG. 5 shows a first component 12 and second component 14 with a larger manufacturing tolerance (MAX) between the two components. The figures show how the movement of the clamping member relative to the first component allows for the variation in manufacturing tolerances to be compensated for.

Figure 6:
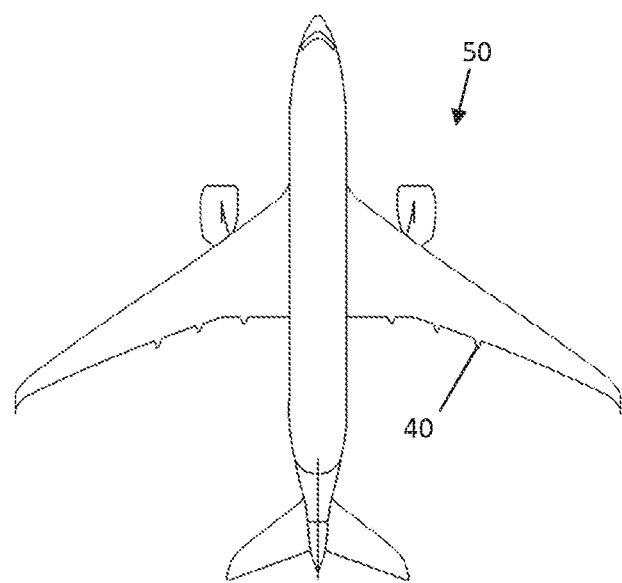
FIG. 6 shows an aircraft including a fastener according to a second embodiment of the invention.

FIG. 6 shows an aircraft 50, the aircraft 50 including an aircraft structure 40 comprising a fastening device 10 as described above.

Figure 7:
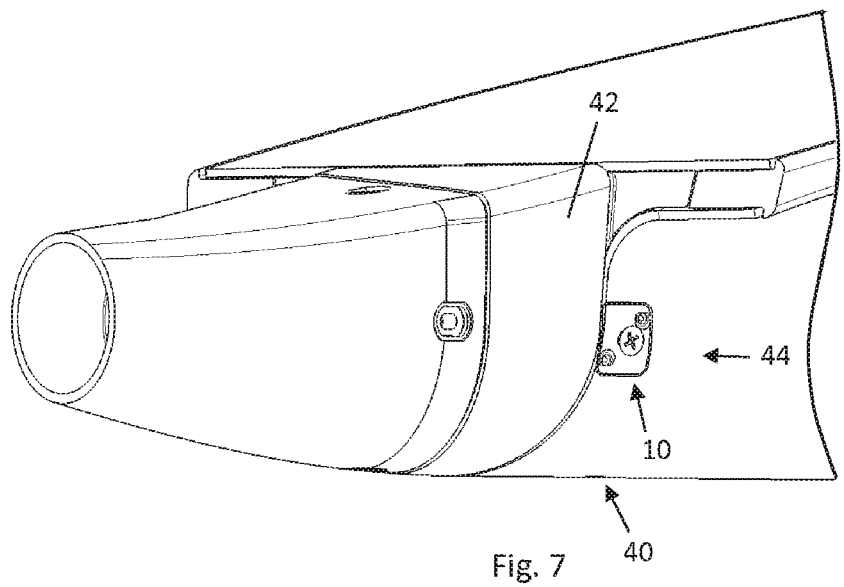
FIG. 7 shows an aircraft component including a plurality of fasteners according to a third embodiment of the invention.
Figure 8:
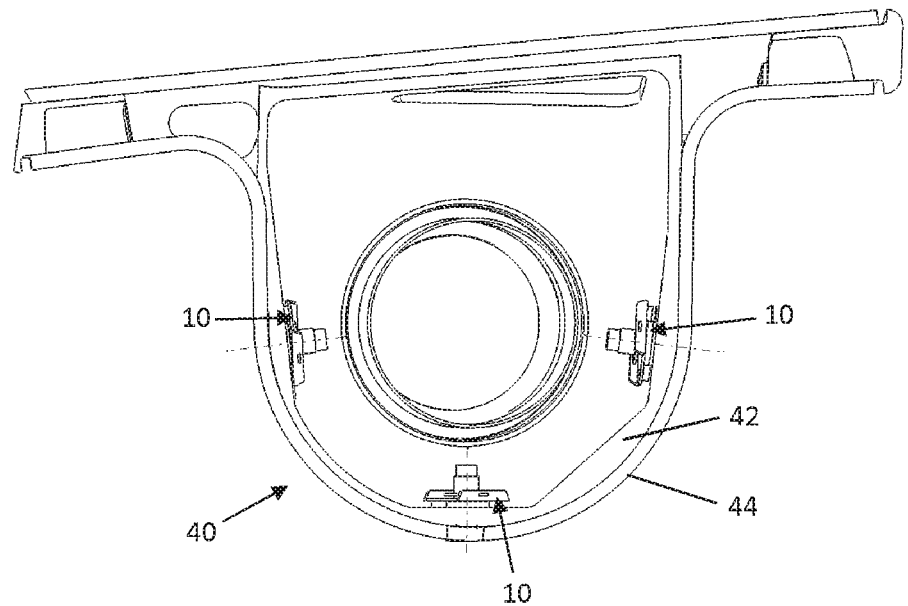
FIG. 8 shows a cross-sectional view of the aircraft component shown in FIG. 7.

FIG. 7 shows the aircraft structure 40, which comprises a composite fairing 44 of a corona jettison fuel outlet. A fastening device 10 secures the composite fairing structure to a metallic component 42 of the fuel outlet. FIG. 8 shows a cross-sectional view of the aircraft structure as shown in FIG. 7, with a plurality of fasteners 10. A plurality of fastening devices 10 are located at various points on the aircraft structure 40, to secure the metallic component 42 and composite component 44 together. There may, for example, be 2 mm gap between the mating surfaces of the two components 42, 44, due to manufacturing tolerances, and the fastening devices 10 according to the invention allow the two components to be fastened together without the two components being urged together, which may load one or both of the two components in an undesired manner. In order that the metallic component 42 and composite component are secured in all degrees of freedom, the plurality of fastening devices 10 must be located in several different orientations across the two components, as shown.

Figure 9:
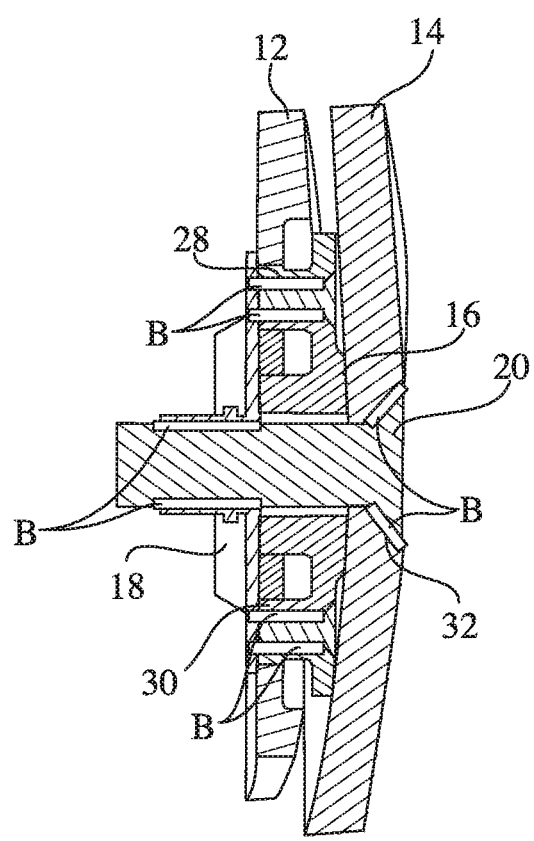
FIG. 9 shows the bonding path between various components of the fastening device according to the first embodiment of the invention.

FIG. 9 shows a fastening device 10 as located in the in aircraft structure 40. In order to comply with the electrical bonding requirements for metallic structures on aircraft, the fastening device 10 must be electrically bonded with the rest of the metallic aircraft structure. The sections B highlighted in FIG. 9 show how the bonding requirements from the fastener 20, through the clamping member 16, and anchor nut 18 are met. The bonding requirements may be met by metallic surfaces being applied to the section B as shown in FIG. 9.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft structure comprising:
a first component having a central aperture extending between opposing faces thereof, and a clamping member receiving portion, surrounding the central aperture, recessed within one of the faces;
a second component having an aperture extending between opposing faces thereof;
a clamping member for fastening the first component to the second component, the clamping member having a main body having an aperture extending between opposing faces thereof and at least one connecting portion that extends away from one of the faces of the main body, wherein the main body is positionable within the clamping member receiving portion between the first component and the second component, such that the first component and the second component can contact each other and the at least one connecting portion extends through a respective aperture formed through the first component;
a fastener with a longitudinal axis; and
an anchor nut arranged on an opposite side of the first component from the main body of the clamping member, wherein the clamping member is engagable with the anchor nut via the at least one connecting portion being in contact with a surface of the anchor nut that faces towards the main body of the clamping member,
wherein the fastener is configured to extend through the apertures in the second component and the clamping member and the central aperture in the first component, and threadedly engage the anchor nut,
wherein the clamping member is movable, relative to the first component, in a first direction parallel to the longitudinal axis of the fastener and is restricted from movement in a second direction, and
wherein, when the clamping member fastens the first and second components, the clamping member and anchor nut are slidable relative to the first component via threaded engagement of the fastener with the anchor nut, such that the main body of the clamping member is slidable from a first position within the clamp receiving portion to a second position which at least partially extends from the clamp receiving portion and is against the second component.

2. The aircraft structure according to claim 1, wherein the at least one connecting portion is at least two connecting portions, and wherein the clamping member is secured to the anchor nut by the at least two connecting portions that are spaced with respect to each other.

3. The aircraft structure according to claim 2, wherein the at least two connecting portions are associated with distinct apertures formed through the first component, the apertures being located such that rotational movement of the clamping member relative to the first component, or movement of the clamping member in the plane of the first component, is prevented.

4. The aircraft structure according to claim 2, wherein the at least two connecting portions define a gap between the anchor nut and the main body of the clamping member.

5. The aircraft structure according to claim 1, wherein the anchor nut comprises a threaded aperture.

6. The aircraft structure according to claim 1, wherein the fastener is a threaded bolt.

7. The aircraft structure according to claim 1, wherein the second component comprises a countersunk aperture for receiving a countersunk bolt end of the fastener.

8. The aircraft structure according to claim 1, wherein the first component is a metal component.

9. The aircraft structure according to claim 1, wherein the second component is a composite component.

10. The aircraft structure according to claim 1, comprising a plurality of clamping members that are each movable in a different direction to others of the plurality of clamping members and fixed in a different direction to the others of the plurality of clamping members.

11. An aircraft comprising at least one aircraft structure according to claim 1.

12. A method of joining a first component and a second component, the method comprising:

providing a first component having a central aperture extending between opposing faces thereof, and a clamping member receiving portion, surrounding the central aperture, recessed within one of the faces;

providing a second component having an aperture extending between opposing faces thereof;

providing a clamping member, which has a main body having an aperture extending between opposing faces thereof and least one connecting portion that extends away from one of the faces of the main body;

locating the clamping member at least partially within the clamping member receiving portion so that the main body is between the first component and the second component and the at least one connecting portion extends through a respective aperture formed through the first component;

arranging an anchor nut on an opposite side of the first component from the main body of the clamping member, so that the at least one connecting portion is in contact with a surface of the anchor nut that faces towards the main body of the clamping member;

attaching, via the at least one connecting portion, the anchor nut to the clamping member, such that the clamping member is movable, relative to the first component, in a first direction that is in a direction of extension of the at least one connecting portion and restricted from movement in a second direction; and inserting a fastener through the apertures in the second component and the clamping member and the central aperture in the first component, and threadedly engaging the fastener with the anchor nut, wherein, when the clamping member fastens the first and second components, the clamping member and anchor nut are slidable relative to the first component via threaded engagement of the fastener with the anchor nut, such that the main body of the clamping member is slidable from a first position within the clamp receiving portion to a second position which at least partially extend from the clamp receiving portion and is against the second component.

* * * * *